(12) United States Patent
Sikorski et al.

(10) Patent No.: US 6,521,331 B1
(45) Date of Patent: Feb. 18, 2003

(54) LAYER STRUCTURE INCLUDING METALLIC COVER LAYER AND FIBER-REINFORCED COMPOSITE SUBSTRATE, AND A METHOD OF MAKING THE SAME

(75) Inventors: Siegfried Sikorski, Munich (DE); Reinhold Schoenacher, Munich (DE); Michael Schober, Munich (DE)

(73) Assignee: MTU Aero Engines GmbH, Munich (DE)

( * ) Notice: Subject to any disclaimer, the term of this patent is extended or adjusted under 35 U.S.C. 154(b) by 0 days.

(21) Appl. No.: 09/517,346

(22) Filed: Mar. 2, 2000

(30) Foreign Application Priority Data

Mar. 5, 1999 (DE) .......................................... 199 09 675

(51) Int. Cl.⁷ .............................. D04H 5/00; B32B 7/08; C04B 35/653
(52) U.S. Cl. ..................... 428/292.1; 428/223; 428/337; 264/60; 264/332
(58) Field of Search .............................. 428/292.1, 337, 428/223; 264/60, 332

(56) References Cited

U.S. PATENT DOCUMENTS 5,294,387 A * 3/1994 Nakano et al. ............... 264/60
5,951,254 A 9/1999 Sikorski et al.

FOREIGN PATENT DOCUMENTS

| DE | 1900477 | 1/1971 |
|----|---------|--------|
| DE | 3036520 | 5/1981 |
| DE | 4208842 | 4/1993 |
| DE | 19627860 | 1/1998 |
| DE | 19642983 | 4/1998 |

* cited by examiner

Primary Examiner—Cynthia H. Kelly
Assistant Examiner—Lawrence Ferguson
(74) Attorney, Agent, or Firm—W. F. Fasse; W. G. Fasse (57) ABSTRACT

A composite laminate or layer structure includes a substrate (2) and a cover layer (4) bonded thereon. The substrate is made up of at least one layer (3) of fiber-reinforced synthetic material. The cover layer includes at least one layer (5) of metal fibers and/or threads (6), and a metal sheet (7) forming the outer surface skin (8) of the layer structure. The metal sheet is bonded by soldering or sintering onto the metal fibers and/or threads (6), while the layer of metal fibers and/or threads in turn is bonded to the underlying fiber-reinforced synthetic material (3) by being mutually and integrally permeated by a synthetic resin matrix and bonding material. Also, the metal fibers and/or threads (6) may be intermeshed with the fibers of the synthetic material (3). To provide improved bonding at both opposite sides thereof, the layer (5) of metal fibers and/or threads (6) has a lower porosity on the side adjoining the metal sheet, and a higher porosity on the side adjoining the fiber-reinforced synthetic material (3) of the substrate.

29 Claims, 4 Drawing Sheets

LAYER STRUCTURE INCLUDING METALLIC COVER LAYER AND FIBER-REINFORCED COMPOSITE SUBSTRATE, AND A METHOD OF MAKING THE SAME

PRIORITY CLAIM

This application is based on and claims the priority under 35 U.S.C. §119 of German Patent Application 199 09 675.9, filed on Mar. 5, 1999, the entire disclosure of which is incorporated herein by reference.

FIELD OF THE INVENTION

The invention relates to a composite layer structure for use on structural components subject to a danger of erosion damage, including at least one fiber-reinforced synthetic material layer as a substrate, and a cover layer that includes at least one layer of metallic fibers and/or threads arranged adjacent to the substrate. The invention further relates to a method of manufacturing such a layer structure.

BACKGROUND INFORMATION

Layer structures or laminates embodied in the manner of fiber-reinforced composites combine the advantages of a low weight as well as a sufficient strength. Such layer structures based on fiber composite materials, however, have a relatively low resistance to erosive wear. For this reason, such fiber composite layer structures must be protected against erosion when they are used in applications in which they are subjected to fluid mechanical impingement, for example when they are used in the fluid flow path of a fluid flow machine, whereby abrasive particles carried in the fluid as well as varying thermal loading of the components would otherwise have a deleterious effect on the fiber composite layer structure. For this reason, various forms of erosion protection for such a layer structure are known in the art.

German Patent 42 08 842 discloses an erosion protection for use on helicopter rotor blades made of fiber-reinforced synthetic materials. Specifically, the erosion protection includes a metal sheet that is glued or adhesively bonded onto the critical areas of the rotor blade that are especially subjected to erosive wear, and the metal sheet is coated with particles of metallic compounds. In this context, it has been discovered that the reliability and durability of the adhesive bonding of the metal sheet onto the underlying fiber composite structure is problematic and inadequate in practice.

German Patent Publication DE 196 27 860 C1 discloses a blade for a fluid flow machine and a method for its manufacture, whereby in at least partial areas, layers of fiber-reinforced synthetic material are protected with a cover layer of metallic fibers or threads, and this cover layer is bonded or connected using the same synthetic resin binder as the layers of fiber-reinforced synthetic material. In this manner, the desired high adhesion of the cover layer onto the underlying layers of fiber-reinforced synthetic material is ensured. It is desirable, however, to further improve the mechanical properties and particularly the abrasive wear and delamination resistance as well as the erosion resistance of such a structure that is to be exposed to high loads.

German Patent Publication 196 42 983 A1 discloses a layered body or laminate with a substrate, as well as a method for manufacturing it. The layered body includes at least one fiber layer and a cover layer adjacent thereto, wherein the cover layer comprises metallic fibers or threads at least on the side thereof adjoining the fiber layer, and wherein the metallic fibers or threads are saturated or impregnated with a binder agent just as the fiber layer. In order to improve the erosion resistance, particles are embedded in the cover layer in the area of the metallic fibers or threads. Such a layered body, however, does not provide an adequate adhesion ability for various functional layers that are to be applied thereon without chemically or physically attacking the resin matrix. Thus, such a layered body must be further improved with regard to its adhesion ability, especially in combination with functional layers to be applied thereon.

German Patent Laying-Open Publication 19 00 477 discloses a composite part comprising a layer of fiber-reinforced synthetic material and a metallic carrier or substrate, on the outer surface of which a layer of metal fibers in the form of mats, fleeces or woven webs is welded or soldered. The metal fibers establish a form-locking connection with the synthetic material and are saturated or impregnated with a binder together with the synthetic material.

SUMMARY OF THE INVENTION

In view of the above, it is an object of the present invention to provide a layer structure of the above described general type, which is improved in such a manner so that the outer surface or skin thereof can be used as a functional outer surface and, for example, provides a good adhesive base for further functional layers applied thereon, whereby the underlying resin matrix is protected during the application as well as the removal of the functional layer or layers. Another object of the invention is to improve the adhesion between an outer metal skin and an underlying fiber-reinforced composite substrate by improving the continuous mutual penetration of a binder agent or matrix material throughout the substrate and the layer of metal fibers and/or threads of the cover layer. It is also an object of the invention to provide a method of manufacturing such a layer structure. The invention further aims to avoid or overcome the disadvantages of the prior art, and to achieve additional advantages, as are apparent from the present specification.

The above objects have been achieved in a composite layer structure according to the invention, comprising a substrate and a cover layer arranged on the substrate. The substrate comprises at least one layer of fiber-reinforced synthetic material including reinforcing fibers and a synthetic resin matrix material. The cover layer includes at least one layer of metallic fibers and/or threads adjacent to the layer of fiber-reinforced synthetic material of the substrate. The metallic fibers and/or threads are impregnated with a synthetic resin binder, and particularly the same synthetic resin binder of the fiber-reinforced synthetic material of the substrate. The cover layer further includes an outer skin comprising a metal sheet that forms an outer surface of the structure and that is connected to the underlying layer or layers of metallic fibers and/or threads at least at a partial area.

The layer of metallic fibers and/or threads has a variable porosity that increases in a direction from the metal sheet or skin toward the fiber-reinforced synthetic material of the substrate. Stated differently, the packing density of the metallic fibers and/or threads increases in a direction from the substrate toward the metal sheet or skin of the cover layer. The varying porosity (or alternatively the varying packing density) may be provided by a porosity (or density) gradient in a single layer of the metallic fibers and/or threads, or especially may be achieved by stacking or layering and laminating a plurality of successive layers of metallic fibers and/or threads, whereby the respective porosity of the successive layers varies layer-to-layer.

Throughout this specification, it should be understood that the terms "outer surface" or "outer skin" or the like can also refer to an exposed surface that is inwardly facing or directed, depending on the particular configuration and construction of the component at hand. For example, if the component is a hollow cylindrical pipe, an "outer surface" or "outer skin" can include the radially inwardly facing interior surface of the pipe wall.

Also, in this specification, the "porosity" of the layer of metallic fibers and/or threads refers to the proportional void space between the fibers and/or threads, especially before impregnation with the binder or matrix material. It should be understood that in the finished layer structure, the binder or matrix material may substantially or entirely fill the void spaces between the metallic fibers and/or threads, so that the finished structure has few or no remaining vacant "pores", and a contrary implication should not be taken from the term "porosity". The "packing density" is essentially the inverse of the "porosity" and refers to the volume proportion of the metallic fibers and/or threads relative to the void spaces therebetween.

The terms "fiber" and "thread" are used herein to refer to elongated configurations of metallic particles. According to ASTM definitions, a "fiber" has a length-to-width aspect ratio of at least 100, and a length of at least 0.5 cm. In the present application, however, a particle will still be regarded as a "fiber" even if it has a somewhat lower aspect ratio, e.g. an aspect ratio of at least 10, or preferably at least 20, or more preferably at least 30, or even more preferably at least 50. A "thread" has a higher aspect ratio than a "fiber", e.g. an aspect ratio of at least 500. It should also be understood that individual "fibers" are preferably not continuous throughout the length, width and thickness of a layer thereof in the inventive structure, while "threads" may be so continuous.

In comparison to prior art arrangements in which a metal sheet is glued or adhesively bonded onto a fiber-reinforced synthetic material substrate, the inventive layer structure achieves a very high adhesion of the cover layer onto the underlying substrate, through the metallic fibers and/or threads of an interface layer of the cover layer. On the one hand, the metallic fibers and/or threads of the interface layer are directly secured to the metal sheet forming the outer surface or skin of the cover layer, for example by soldering or sintering. On the other hand, the metallic fibers and/or threads are integrally bonded with the underlying fiber-reinforced synthetic substrate layer by the mutual penetration of the synthetic resin matrix material through the interface layer of metallic fibers and/or threads as well as through the substrate layer of fiber-reinforced synthetic material. Furthermore, the metallic fibers and/or threads may be intimately intertwined or intermeshed with the fibers of the underlying fiber-reinforced synthetic of the substrate, for example by simple lay-up and compressing of the successive layers onto each other, or by purposely inter-needling the metallic fibers and/or threads into the underlying fiber-reinforced synthetic material. The mutual, integral penetration of the synthetic resin matrix material is especially enhanced by the porosity gradient or packing density gradient of the at least one layer of metallic fibers and/or threads. Moreover, the layer structure having a metal sheet as an outer skin provides a good id adhesive base for the application of further functional layers or coatings, for example which may be thermally sprayed or galvanically deposited onto the metal skin, while the matrix lying under the metal sheet is protected against chemical and/or physical attack.

In addition to providing a protection against erosion and chemical attack and degradation of the underlying fiber-reinforced composite materials in the final end use application of the layer structure and during application of functional coatings, the metal sheet forming the outer surface or outer skin provides several further advantages as well. For example, the metal sheet forming the outer skin protects the layer structure and particularly its synthetic matrix against the penetration of liquids or gases into the matrix during the cleaning or delacquering of the layer structure using solvents, other chemicals, and/or hot steam. The metal sheet skin also protects the matrix from being directly subjected to fire or heat influences, for example in the event of an accidental fire near the component including the inventive layer structure. Thereby the metal skin helps protect the synthetic matrix against overheating and/or thermal breakdown. Furthermore, the metal sheet skin can be structured, textured, patterned, or otherwise embodied as a functional surface. For example, a so-called "shark skin" pattern or texture can be embossed on the metal sheet skin in order to reduce the aerodynamic resistance of corresponding components of an aircraft, for example the skin of the fuselage or of the lifting surfaces.

In one embodiment, the metal sheet and the metallic fibers and/or threads are connected with each other by sintering or soldering, whereby the metal sheet and the metallic fibers and/or threads are securely bonded together to form the cover layer, which in turn can be bonded with good adhesion onto the substrate comprising at least one layer of fiber-reinforced synthetic material, by the mutual penetration of a binder such as a synthetic resin through the metal fibers and/or threads as well as the reinforcing fibers of the synthetic substrate material. Due to the sintering, the metallic fibers and/or threads are welded or melted to each other, i.e. the metallic fibers and/or threads form an interconnected porous mass or network as well as being firmly bonded to the metal sheet. As a result, the metallic fibers and/or threads are not easily separated due to external loads being applied to the layer structure, or even due to cracking of the resin matrix itself. Thus, the inventive layer structure maintains its structural integrity, even when it is subjected to extreme loads, for example as a result of pressure applied to the outer surface formed by the metal sheet (e.g. in the case of a crankshaft), impact of a foreign body such as a stone or the like against the outer surface formed by the metal sheet, handling errors during assembly and installation, or collisions of aircraft incorporating the inventive layer structure with other vehicles (such as a ground maintenance vehicle accidentally colliding into the fuselage of an aircraft). Under such severe loading or impact conditions, the metal sheet skin may be dented or otherwise deformed, and the underlying resin matrix reinforced by the metallic fibers and/or threads may be correspondingly deformed. Nonetheless, the above described secure bonding of the fibers and/or threads with each other to form a network, as well as the secure bonding of the metal sheet skin to the metallic fibers and/or threads, and the secure bonding of the metallic fibers and/or threads to the underlying fiber-reinforced synthetic material layer of the substrate, provide a significant strength and resistance against rupture or fracture of the layer structure.

Preferably, the metal sheet for the skin and the metallic fibers and/or threads can respectively be made of metallic materials having similar or the same melting temperatures. For example, suitable materials include alloys of steel or nickel.

According to a further embodiment of the invention, the cover layer may comprise two metal sheets that are spaced apart from each other, with at least one intermediate layer of metallic fibers and/or threads arranged therebetween. In such an arrangement, the metallic fibers and/or threads serve to bond or connect the two metal sheets with each other. The outer one of the two metal sheets forms the outer surface or skin of the layer structure. Channels, tubes, passages or other conduits for conveying a cooling medium therethrough can be arranged in the space between the two metal sheets. Such an arrangement provides an extremely good cooling of the surface of the layer structure, as well as a good thermal protection for the underlying fiber-reinforced composite material.

In order to achieve an especially good adhesion of the cover layer onto the underlying substrate, the layer or layers of fiber-reinforced synthetic material forming the substrate and the metallic fibers and/or threads of the cover layer are preferably saturated or impregnated and thereby bonded by the same binder material, for example a synthetic resin, which permeates continuously through the voids between the reinforcing fibers of the substrate as well as the voids between the metallic fibers and/or threads of the cover layer. As a result, the various fibers are embedded in the continuous integral resin matrix in the finished structure after the resin has cured. The degree of embedding does not have to be 100% solid. The binder may be a mixed polymer product of synthetic resin or resins, for example, epoxy resin, phenolic resin, and/or polyimides.

The metallic fibers and/or threads of the cover layer can be provided in the form of a non-woven and non-oriented fleece or felt, and/or a braided or knitted fabric or mat, and/or a woven web, fabric or mat. The use of a fleece or felt of metallic fibers and/or threads is particularly advantageous, because the non-oriented mass of the fibers of the fleece allows an elastic deflection or deformation of the fibers in response to an impact of a foreign object against the inventive layer structure, which absorbs and dissipates the impact energy and reduces the risk of a fiber rupture. If a fiber rupture should occur nonetheless, the rupture damage will remain locally limited, since each fiber of a fleece does not extend continuously throughout the entire fleece layer, but rather has a limited length, in contrast to a woven web of threads, in which each thread generally extends continuously through the entire width or length of the woven web. The layer or layers of metallic fibers and/or threads of the cover layer may also include a combination of a fleece layer with a braided or knitted layer and/or a woven layer.

As described above, the porosity of the layer or layers of metallic fibers and/or threads of the cover layer increases in a direction toward the underlying substrate layer of fiber-reinforced synthetic material. Thereby, the penetration and saturation of the binder agent and particularly the resin matrix material into the layer of metallic fibers and/or threads is improved and simplified, so as to improve the overall matrix bonding effect. Preferably, the outermost layer or portion of the metallic fibers and/or threads adjacent to the metal sheet forming the outer skin has a porosity of approximately 95% or less, while the metallic fibers and/or threads adjacent to the underlying fiber-reinforced synthetic material of the substrate have a higher porosity greater than 95%, e.g. of at least 97%. Alternatively, the overall metallic fibers and/or threads of the cover layer have an average porosity of about 95%, with a lower porosity adjacent to the metal sheet and a higher porosity adjacent to the substrate.

The cover layer can be formed on more than one side of the substrate. In other words, the cover layer may even essentially completely enclose and surround the substrate on all sides thereof. Significant for the invention is simply that the cover to layer is provided on at least one side or one surface of the substrate.

The above objects have been further achieved in a method of manufacturing a layer structure according to the invention, wherein the metallic fibers and/or threads are connected to the metal sheet forming the outer skin by means of sintering or soldering, and thereafter the at least one layer of fiber-reinforced synthetic material of the substrate is bonded together with the metallic fibers and/or threads using a binder agent such as a synthetic resin that is impregnated mutually and continuously into the metallic fibers and/or threads as well as the synthetic reinforcing fibers of the substrate. In a particular embodiment of the method, the metallic fibers and/or threads are set simply with a contact pressure against the metal sheet, essentially without any additional compressive pressure, in a two-part mold of coated steel. Then, the arrangement is heated to a temperature approximately 10° C. below the respective melting temperature of the metal materials, whereby the metallic fibers and/or threads are sinter-bonded or solder-bonded to the metal sheet.

BRIEF DESCRIPTION OF THE DRAWINGS

In order that the invention may be clearly understood, it will now be described in connection with example embodiments, with reference to the accompanying drawings, wherein.

DETAILED DESCRIPTION OF PREFERRED EXAMPLE EMBODIMENTS AND OF THE BEST MODE OF THE INVENTION

Figure 1:
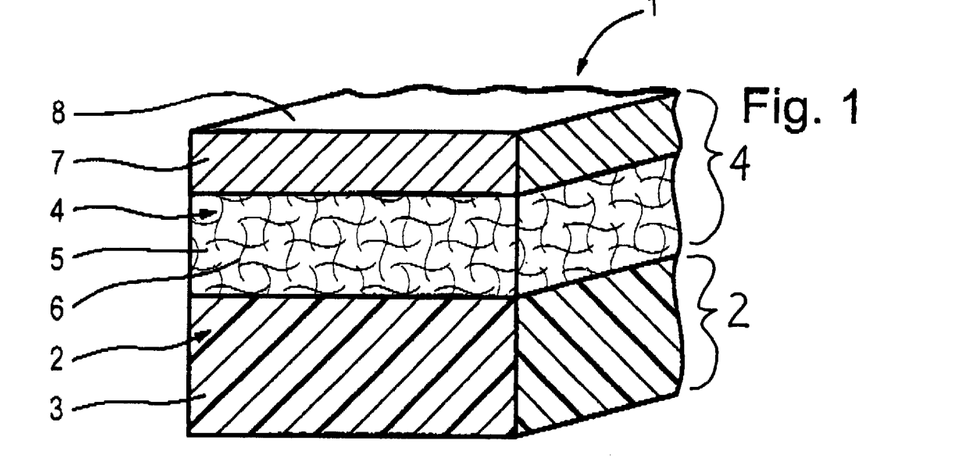
FIG. 1 is a schematic perspective sectional view of a first embodiment of a layer structure according to the invention.

FIG. 1 shows an example embodiment of a layer structure 1 that includes a cover layer 4 arranged on a substrate 2. The substrate 2 essentially consists of a layer of fiber-reinforced synthetic material 3. The cover layer 4 comprises an interface layer 5 of metallic fibers and/or threads 6 adjacent to and bonded to the underlying substrate layer of fiber-reinforced synthetic material 3. The cover layer 4 further comprises a metal sheet 7 forming the outer surface or outer skin 8 of the layer structure 1. The metallic fibers and/or threads 6 and the metal sheet 7 consist of the same metallic material.

A first step in manufacturing the layer structure 1 involves sintering the threads and/or fibers 6 to the metal sheet 7 at a temperature of about 10° C. below the melting temperature of their metallic material, so as to bond the materials together to form the cover layer 4. The manufacturing method next involves bonding the cover layer 4 with the substrate 2, as discussed below.

The interface layer 5 of metallic fibers and/or threads 6 has a sufficient porosity, i.e. a sufficient volume percentage of void spaces between and among the fibers and/or threads 6, to allow this layer 5 to be impregnated and saturated with a binder agent such as a synthetic resin matrix material. Particularly, the porosity of the layer 5 exhibits a gradient, with a lower porosity on the side adjoining the metal sheet 7 and a higher porosity on the side adjoining the substrate layer 2. Thereby, the lower porosity and thus greater packing density of the layer 5 adjoining the metal sheet 7 provides a greater number and/or area density of metal-to-metal contact points between the metallic fibers and/or threads 6 and the metal sheet 7 to provide an improved direct metal-to-metal bond therebetween. On the other hand, the higher porosity and thus lower packing density of the layer 5 on the other side thereof improves the intertwining or intermeshing of the metallic fibers and/or threads 6 with the fibers of the fiber-reinforced synthetic 3 of the substrate layer 2, as well as an increased void proportion to be more readily impregnated and saturated with the resin matrix material, thereby mutually and integrally bonding the layer 5 with the layer 3. The porosity gradient in the layer 5 may be a continuous monotonous gradient, or a step-wise gradient, for example. Preferably, the average overall porosity is about 95%, with a porosity greater than 95% on the side facing the substrate 2 and a porosity less than 95% on the side facing the metal sheet 7.

The method of manufacturing the layer structure 1 according to FIG. 1 proceeds as follows after the cover layer 4 has been formed by sintering as described above. Next, one or more layers of the fiber-reinforced synthetic material 3 are laid-up together with the cover layer 4 in a form. Then a suitable binder agent such as a synthetic resin is impregnated and saturated into the laid-up structure including the layer 5 of metallic fibers and/or threads 6 as well as the one or more layers of fiber-reinforced synthetic material 3. Finally, the binder agent is cured and hardened to bond together the layers, and rigidify the layered composite.

Figure 2:
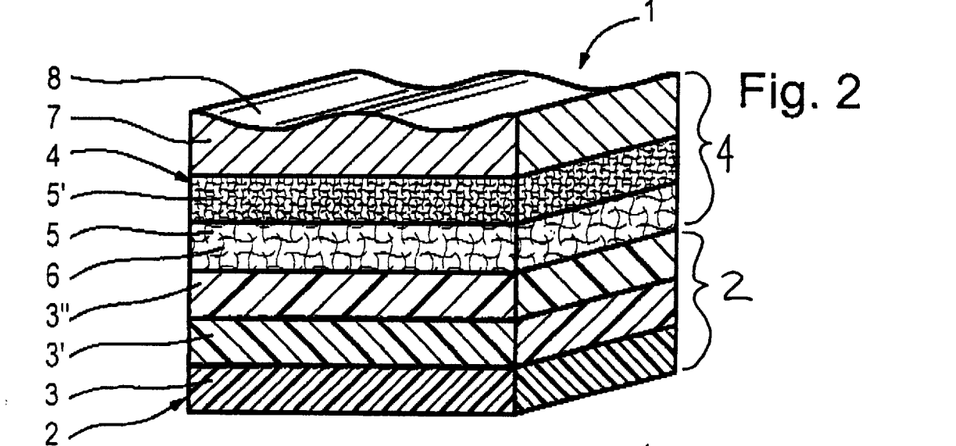
FIG. 2 is a schematic sectional view similar to that of FIG. 1, but showing a second embodiment of a layer structure according to the invention.

A further example embodiment of a layer structure 1 is illustrated in FIG. 2. In this embodiment, it becomes clear that the overall substrate layer 3 can be made up of sub-layers 3, 3' and 3", and the overall interface layer 5 can be made up of sub-layers 5, 5'. More specifically, the substrate 2 comprises three stacked layers 3, 3' and 3" of fiber-reinforced synthetic material. Preferably, carbon fibers are predominantly used as the reinforcing fibers for the layers 3, 3' and 3". Each one of the layers 3, 3' and 3" is respectively embodied with a fleece, knitted or braided, and/or woven construction of reinforcing fibers. The particular fiber material, the density, thickness, and fabric mat or layer forming technique (e.g. fleece, braiding, knitting, weaving, etc.) can be selected as needed, independently for each layer, to achieve the required mechanical properties of the overall substrate 2.

In any event, a proper porosity is provided so that the binder agent and particularly a synthetic resin will permeate into the fibrous material of the layers 3, 3' and 3" to form a coherent matrix. Preferably in this regard, the density of the layer 3" adjacent to the interface layer 5 of metal fibers and/or threads 6 is less (i.e. the porosity thereof is greater) than that of the layer 3 of fiber-reinforced synthetic material farthest away from the cover layer 4. In this manner, the mutual permeation of the resin matrix and bonding material between the cover layer 4 and the substrate 2 is improved. Also, the intermeshing or intertwining of the metallic fibers and/or threads 6 with the fibers of the synthetic material 3" is facilitated.

Further in the embodiment according to FIG. 2, the cover layer 4 includes two layers 5 and 5' of metallic fibers and/or threads 6. While a fleece material is preferably used for the layers 5 and 5' as discussed above, the layer 5 of metallic fibers and/or threads 6 adjacent to the layer 3" of the fiber-reinforced synthetic material does not necessarily entirely consist of a fleece. Alternatively or additionally to a layer 5 of a fleece, other fleece types or woven webs, or braided or knitted fabric layers can be incorporated as well. The two layers 5 and 5' may use different materials, thicknesses, etc. as needed to achieve the required characteristics in a given application.

The two layers 5 and 5' provide a convenient way of establishing the porosity gradient of the metallic fibers and/or threads 6 as discussed above in connection with FIG. 1. Namely, the two layers 5 and 5' simply each have a different porosity, whereby the layer 5' adjacent to the metal sheet 7 forming the outer skin 8 has a porosity of about 95%, while the layer 5 adjacent to the layer 3" of fiber-reinforced synthetic material has a greater porosity to improve the impregnation and bonding by means of the binder agent, e.g. resin matrix material. Thus, the metallic fibers and/or threads 6 have a sharp step-wise gradient through the thickness of the overall interface layer, with a lower porosity in the layer 5' and a higher porosity in the layer 5.

Additional components may be incorporated both into the substrate 2 as well as into the layers 5 and 5' of metallic fibers and/or threads 6. The incorporation of such additional components can be according to any conventional knowledge in the art of fiber-reinforced composite materials, for improving specific characteristics of the resulting composite material.

As can be seen in FIG. 2, the outer surface or skin 8 formed by the metal sheet 7 is textured or surface-configured or patterned in this example embodiment. Such a feature can have advantageous effects as a functional surface in a particular application, such as an aerodynamic surface having a reduced aerodynamic resistance for an aircraft or the like.

Figure 3:
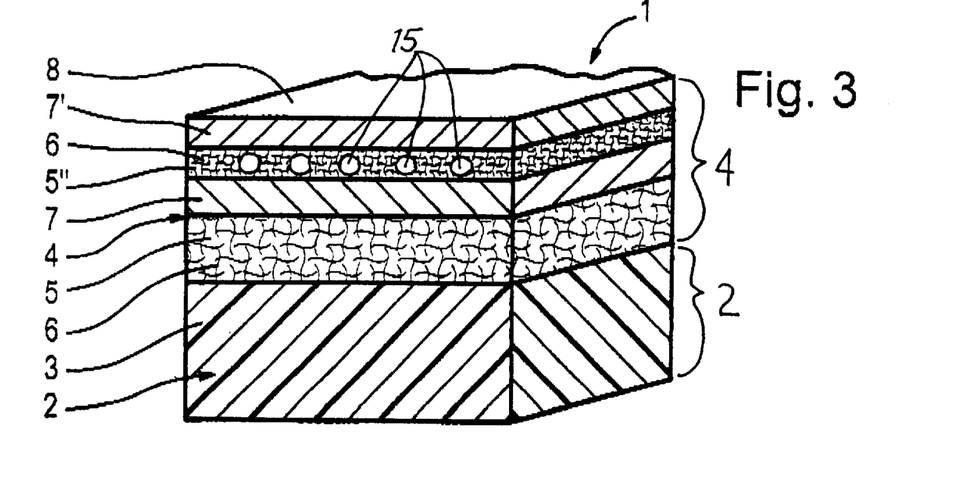
FIG. 3 is another view similar to that of FIG. 1, but showing a third embodiment of a layer structure according to the invention.

FIG. 3 shows a further alternative embodiment of a layer structure 1 according to the invention, which comprises a substrate 2 made up of a single layer 3 of fiber-reinforced synthetic material. The cover layer 4, however, comprises two metal sheets 7 and 7' with an intermediate layer 5" of metallic fibers and/or threads 6 arranged between the inner metal sheet 7 and the outer metal sheet 7', as well as an interface layer 5 of metallic fibers and/or threads 6 arranged between the inner metal sheet 7 and the substrate 2. The outer metal sheet 7' forming the outer surface or skin 8 is bonded onto the inner metal sheet 7 by sintering the intermediate layer 5" of metallic fibers and/or threads 6 therebetween. Coolant channels or conduits 15 may be provided extending through the layer 5" of metallic fibers and/or threads 6 between the two metal sheets 7 and 7', whereby such coolant channels or conduits 15 are adapted to convey a cooling medium therethrough, for cooling the overall layer structure 1 and particularly the cover layer 4.

Figure 4:
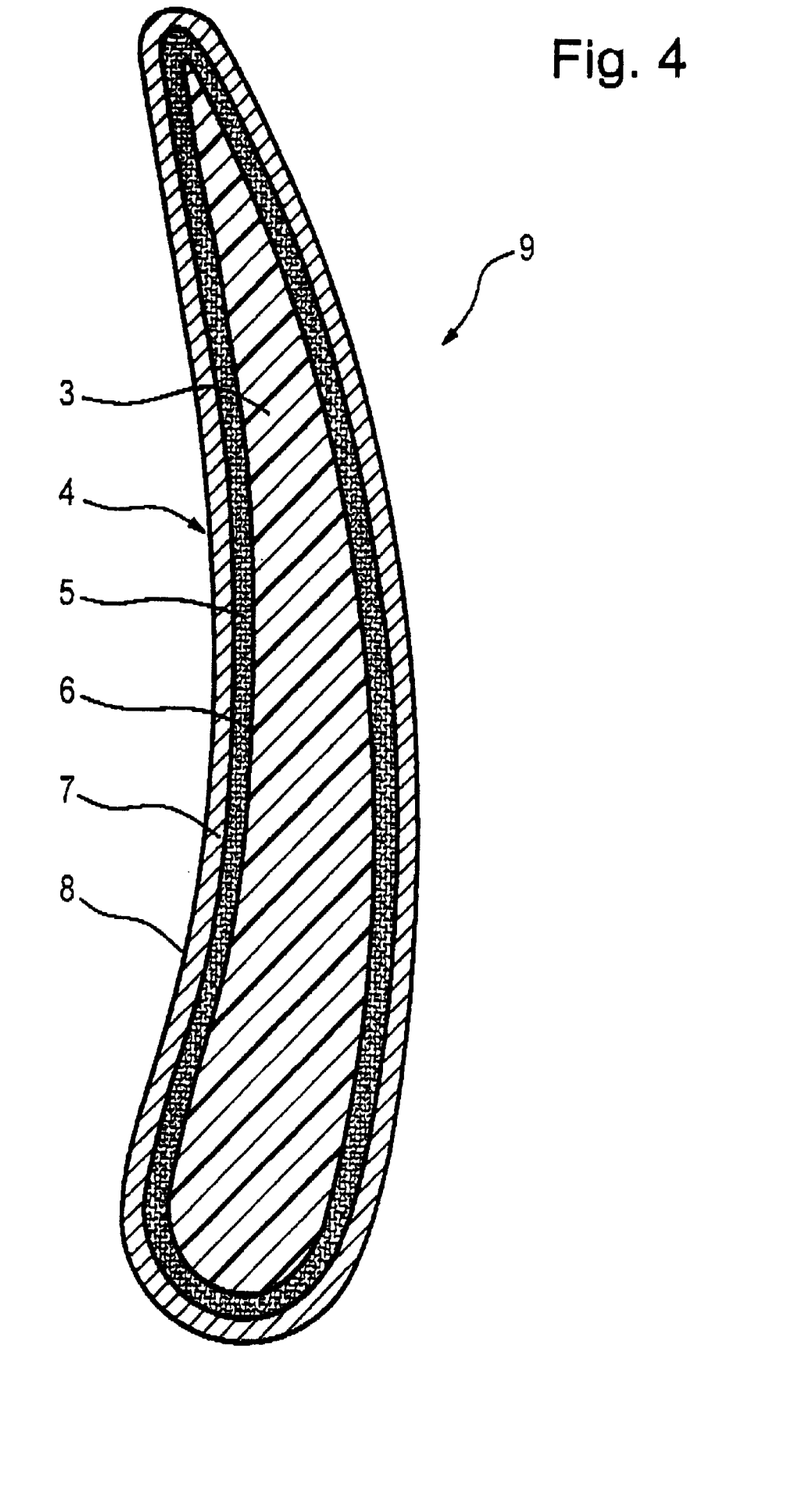
FIG. 4 is a schematic cross-section of a blade of a fluid flow machine constructed as an example embodiment of a layer structure according to the invention.

FIG. 4 shows a cross-section through a blade 9 of a fluid flow machine such as a gas turbine, wherein this blade 9 is embodied as a layer structure according to the invention. Namely, a core of this blade 9 is formed by a least one layer 3 of a fiber-reinforced synthetic material. A cover layer 4 that covers this core 3 comprises a layer 5 of metallic fibers and/or threads 6 and a metal sheet 7 of a nickel-based alloy that is sinter bonded onto the layer 5. In this regard, the metal sheet 7 preferably consists of the same material as the metal fibers and/or threads 6, or in any event, has substantially the same melting temperature (e.g. melting temperatures within ±10° C. of each other). The metal sheet 7 forming the outer surface 8 of the blade 9 provides a protection of the underlying fiber-reinforced composite core 3. Moreover, the metal sheet 7 forms a good adhesive base for applying one or more functional coatings thereon, such as, for example, a coating of material that is thermally sprayed or galvanically deposited onto the metal sheet 7. Such protective measures are especially pertinent when the blade 9 is used close to the compressor in a gas turbine. Since the metal sheet 7 preferably provides a closed surface 8 for the blade 9, this metal sheet 7 prevents such functional coating materials from penetrating into and thereby chemically or physically attacking and damaging the binder agent or matrix resin of the layer 3 of synthetic material forming the core, or the binder material or matrix resin of the layer 5 of metallic fibers and/or threads 6.

Figure 5:
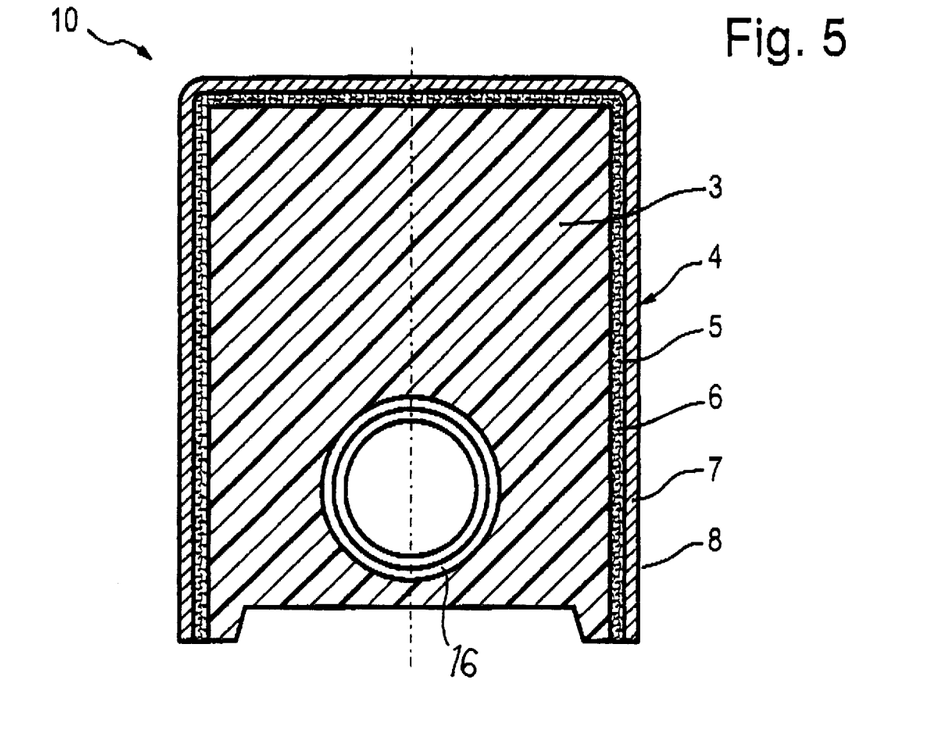
FIG. 5 is a schematic lengthwise section of a piston constructed as a further example embodiment of a layer structure according to the invention.

As a further example embodiment of a layered structure according to the present invention, FIG. 5 shows a piston 10 that predominantly comprises a core made up of at least one layer 3 of a fiber-reinforced synthetic material and a bearing support sleeve 16. The piston 10 further comprises a cover layer 4 that essentially entirely encloses the core 3 to form the outer surface 8 of the piston, including the circumferential or cylindrical side surface thereof, as well as the working end face thereof. The cover layer 4 comprises a layer 5 of metallic fibers and/or threads 6 adjoining the layer or core 3 of fiber-reinforced synthetic material, as well as an outwardly positioned metal sheet 7 forming the actual outer surface 8. The piston 10 formed in the manner of the present inventive layer structure has significant weight advantages in comparison to a conventional piston. Moreover, the matrix resin of the core layer 3 of fiber-reinforced synthetic material as well as the layer 5 of metallic fibers and/or threads 6 is protected against overheating or the like by the outer metal sheet 7. As has been discussed above, the combination of the metal sheet 7 together with the metallic fibers and/or threads 6 also provides significant mechanical advantages and protection against impact or shock damage.

Figure 6:
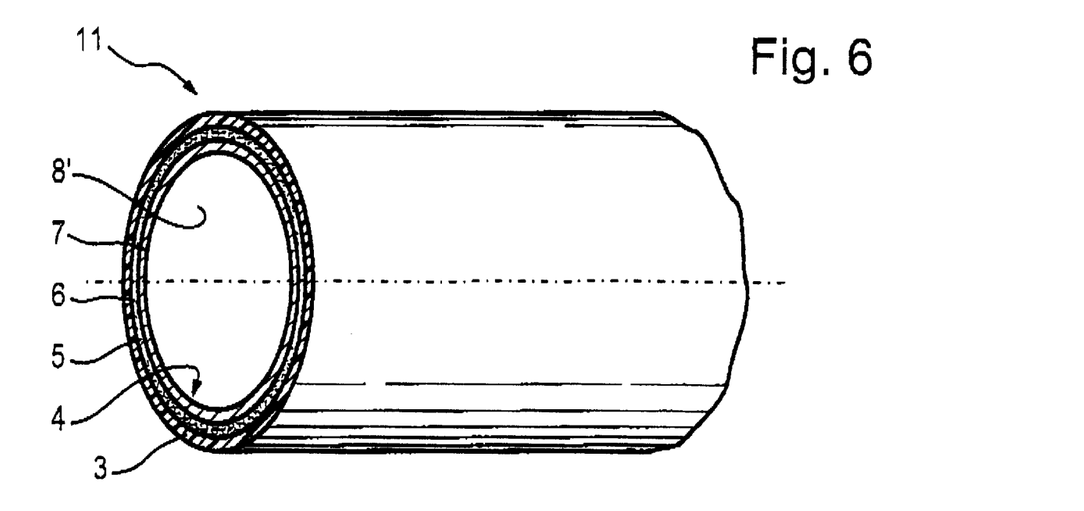
FIG. 6 is a schematic perspective view of a sectioned cylindrical pipe constructed as an example embodiment of a layer structure according to the invention.

FIG. 6 shows a further example embodiment of an inventive layer structure in the form of a cylindrical hollow pipe 11. The pipe 11 essentially comprises a cylindrical sleeve or shell 3 of fiber-reinforced synthetic material as well as a cover layer 4 forming its radially inwardly facing "outer" surface 8'. The cover layer 4 comprises a layer 5 of metallic fibers and/or threads 6 adjoining the layer 3 of fiber-reinforced synthetic material, as well as a metal sheet 7 which actually forms the inwardly facing outer surface 8' of the pipe 11. To manufacture such a pipe 11, the metal sheet 7 is first bonded to the layer 5 of metallic fibers and/or threads 6 by means of sintering. The metal sheet 7 is formed into a cylindrical pipe or shell configuration either before or after sinter bonding the fibers and/or threads 6 onto the metal sheet 7. Thereafter, the layer 3 of reinforcing fiber material is laid onto the layer 5, and then the metallic fibers and/or threads 6 as well as the reinforcing fibers of the layer 3 are impregnated with a binder agent or resin matrix, which is subsequently cured to bond the materials to each other and rigidly form the pipe 11. In such a pipe 11, the inner surface 8' thereof is protected against high temperature and potentially corrosive liquid or gaseous materials that may be conveyed through such a pipe.

Figure 7:
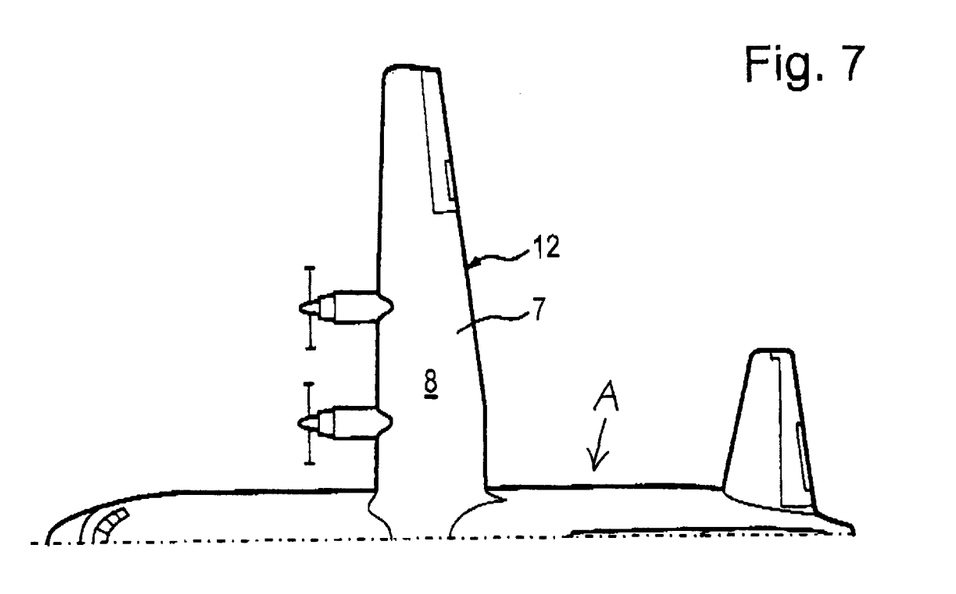
FIG. 7 is a schematic plan view of a portion of an aircraft including a lifting wing embodied according to the invention.

In a partial top plan view, FIG. 7 shows an aircraft A having a lifting surface 12 and particularly an airfoil wing 12, which is at least partially or in a section thereof embodied as a layer structure according to the invention. Particularly, as can be understood in connection with FIGS. 1, 2 and 3 for example, the lifting surface 12 comprises layers of fiber-reinforced synthetic material 3 as well as a cover layer 4 including at least one layer 5 of metallic fibers and/or threads 6 and a metal sheet 7 forming the outer surface 8 of the lifting airfoil wing 12. The metal sheet 7 serves as a lightning protective layer and can also be textured or structured as a functional surface, for example being textured with a so-called "shark skin" texture for reducing the aerodynamic resistance.

Figure 8:
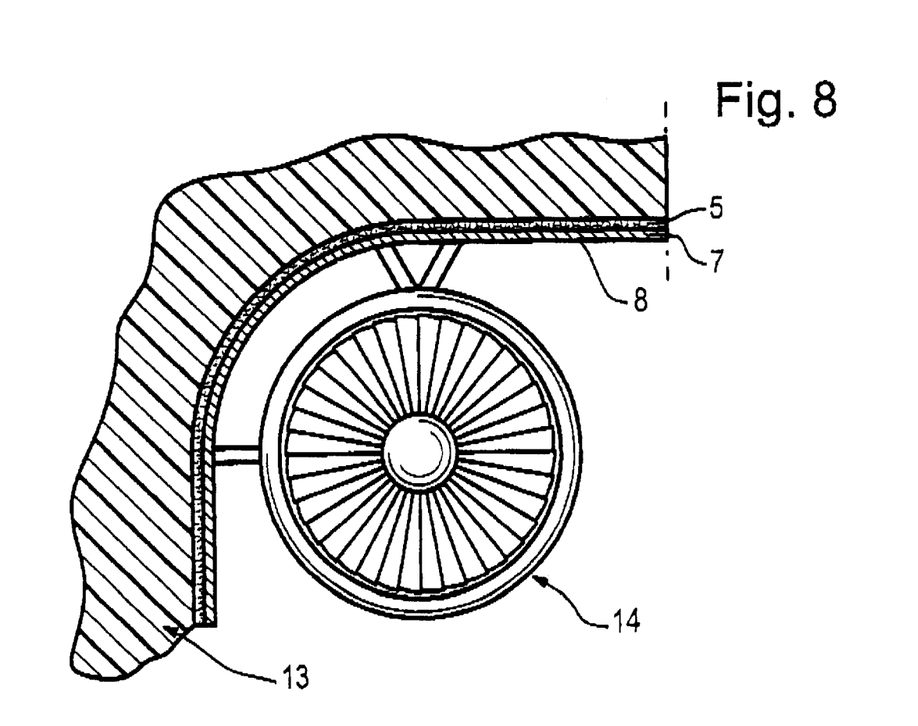
FIG. 8 is a schematic section of an engine housing of an aircraft embodied according to the invention.

FIG. 8 schematically shows a sectional view of a housing 13 of an aircraft, with an aircraft engine 14 mounted in this housing 13. At least a portion of the housing 13 is embodied as a layer structure according to the invention, and includes a substrate of fiber-reinforced synthetic material as well as a cover layer arranged thereon including at least one layer 5 of metal fibers and/or threads 6, as well as a metal sheet 7 forming the outer surface 8 of the housing 13. The metal sheet 7 particularly provides a fire and heat protection function, for example in the event of a titanium fire originating in the engine 14.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A layered composite structure comprising a substrate and a cover layer arranged on said substrate, wherein:
    said substrate comprises a substrate layer of a fiber-reinforced synthetic material including a substrate matrix and reinforcing fibers embedded in said substrate matrix;
    said cover layer comprises an interface layer including an interface layer matrix and metallic particles selected from the group consisting of metallic fibers and metallic threads, which are embedded in said interface layer matrix;
    said cover layer further comprises an outer skin including a first metal sheet that is at least in partial areas thereof connected to said metallic particles of said interface layer;
    said cover layer is oriented and arranged with said outer skin facing away from said substrate and with said interface layer adjacent and connected to said substrate; and
    said interface layer has a packing density gradient of said metallic particles in a direction through a thickness of said interface layer from said outer skin to said substrate, with a first packing density of said metallic particles at a first side of said interface layer adjacent to said outer skin and a second packing density of said metallic particles at a second side of said interface layer adjacent to said substrate, wherein said first packing density is higher than said second packing density.

2. The layered composite structure according to claim 1, wherein said packing density gradient is a gradient that varies continuously without steps through said thickness of said interface layer.

3. The layered composite structire according to claim 1, wherein said packing density gradient is a step-wise varying gradient that varies through a plurality of packing density steps through said thickness of said interface layer.

4. The layered composite structure according to claim 1, wherein said interface layer consists of a single integral layer of said metallic particles embedded in said interface layer matrix.

5. The layered composite structure according to claim 1, wherein said interface layer comprises a plurality of stacked sub-layers of said metallic particles embedded in said interface layer matrix, and wherein said sub-layers respectively have different packing densities of said metallic particles establishing said packing density gradient of said interface layer.

6. A layered composite structure comprising a substrate and a cover layer arranged on said substrate, wherein:
said substrate comprises a substrate layer of a fiber-reinforced synthetic material including a substrate matrix and reinforcing fibers embedded in said substrate matrix;
said cover layer comprises an interface layer including an interface layer matrix and metallic particles selected from the group consisting of metallic fibers and metallic threads, which are embedded in said interface layer matrix;
said cover layer further comprises an outer skin including a first metal sheet that is at least in partial areas thereof connected to said metallic particles of said interface layer;
said cover layer is oriented and arranged with said outer skin facing away from said substrate and with said interface layer adjacent and connected to said substrate; and
said interface layer has a volume percentage gradient of a content of said interface layer matrix, with a first volume percentage of said interface layer matrix at a first side of said interface layer adjacent to said outer skin and a second volume percentage of said interface layer matrix at a second side of said interface layer adjacent to said substrate, wherein said first volume percentage is lower than said second volume percentage.

7. The layered composite structure according to claim 6, wherein said content of said interface layer matrix has an average volume percentage averaged throughout said interface layer of about 95%.

8. A layered composite structure comprising a substrate and a cover layer arranged on said substrate, wherein:
said substrate comprises a substrate layer of a fiber-reinforced synthetic material including a substrate matrix and reinforcing fibers embedded in said substrate matrix;
said cover layer comprises an interface layer including an interface layer matrix and metallic particles selected from the group consisting of metallic fibers and metallic threads, which are embedded in said interface layer matrix;
said cover layer further comprises an outer skin including a first metal sheet that is at least in partial areas thereof connected to said metallic particles of said interface layer;
said cover layer is oriented and arranged with said outer skin facing away from said substrate and with said interface layer adjacent and connected to said substrate; and
said first metal sheet is connected to said metallic particles by at least one of soldered joints and sintered joints at respective contact points between said metallic particles and said first metal sheet.

9. The layered composite structure according to claim 8, wherein said first metal sheet and said metallic particles respectively consist of respective metallic materials that have respective melting temperatures that are within ±10° C. of each other.

10. The layered composite structure according to claim 9, wherein said metallic materials are alloys of at least one of steel and nickel.

11. The layered composite structure according to claim 8, wherein said first metal sheet and said metallic particles respectively consist of the same metallic material.

12. The layered composite structure according to claim 1, wherein said cover layer further includes a second metal sheet arranged spaced apart from said first metal sheet, and an intermediate layer comprising additional metallic particles selected from the group consisting of metallic fibers and metallic threads arranged between said first and second metal sheets, wherein at least some of said additional metallic particles are connected respectively to said first and second metal sheets so that said intermediate layer connects together said first and second metal sheets, and wherein said second metal sheet faces away from said substrate and forms an outer surface of said outer skin.

13. The layered composite structure according to claim 12, wherein said cover layer further includes coolant medium flow conduits arranged between said first and second metal sheets.

14. The layered composite structure according to claim 1, wherein said outer skin includes a metal outer surface that has a surface texture adapted to affect an aerodynamic flow characteristic of said outer surface.

15. The layered composite structure according to claim 1, wherein said outer skin includes a metal outer surface, and said layered composite structure further comprises a protective surface coating that is thermally sprayed or galvanically deposited on said metal outer surface.

16. The layered composite structure according to claim 1, wherein said substrate matrix and said interface layer matrix both consist of the same matrix material that has been mutually impregnated into spaces between said reinforcing fibers and spaces between said metallic particles, wherein said substrate matrix and said interface layer matrix together form a continuous integral unitary matrix of said matrix material throughout said substrate and said interface layer, and wherein said integral unitary matrix bonds together said substrate and said cover layer.

17. The layered composite structure according to claim 16, wherein said matrix material comprises a mixed polymer product of synthetic resins.

18. The layered composite structure according to claim 16, wherein said metallic particles and said reinforcing particles are intermeshed with each other along an interface of said interface layer adjoining said substrate layer.

19. The layered composite structure according to claim 1, wherein said metallic particles and said reinforcing particles are intermeshed with each other along an interface of said interface layer adjoining said substrate layer.

20. The layered composite structure according to claim 1, wherein said interface layer comprises a fleece, felt, knit, braid or weave of said metallic particles.

21. The layered composite structure according to claim 1, wherein said cover layer is arranged on plural surfaces of said substrate, and said cover layer encloses said substrate on all sides thereof.

22. The layered composite structure according to claim 1, wherein said substrate layer comprises a plurality of stacked sub-layers of fiber-reinforced synthetic material, and wherein said sub-layers respectively have different compositions to provide different characteristics.

23. The layered composite structure according to claim 1, configured as a blade for a fluid flow machine.

24. The layered composite structure according to claim 1, configured as a piston for a piston machine.

25. The layered composite structure according to claim 1, configured as a hollow pipe, wherein said outer skin of said cover layer forms a radially inwardly facing interior surface of said hollow pipe.

26. The layered composite structure according to claim 1, configured as a component of an aircraft.

27. A method of manufacturing the layered composite structure according to claim 1, comprising the following steps:
   a) providing a first starting layer comprising said metallic particles;
   b) bonding together said first starting layer and said first metal sheet by contacting said first starting layer with said first metal sheet and soldering or sintering said metallic particles and said first metal sheet together;
   c) arranging a second starting layer comprising said reinforcing particles in contact with said first starting layer, after said step b);
   d) impregnating said first starting layer and said second starting layer with a matrix material, after said step c); and
   e) curing said matrix material to form thereof said interface layer matrix and said substrate matrix.

28. The method according to claim 27, wherein said contacting in said step b) comprises applying only sufficient contact force to establish contact between said metallic particles and said first metal sheet without compressing said first starting layer.

29. The method according to claim 27, wherein said soldering or sintering of said step b) comprises heating said first metal sheet and said metallic particles to a bonding temperature about 10° C. below a melting temperature of said first metal sheet and said metallic particles, and maintaining said bonding temperature to carry out said soldering or sintering.

\* \* \* \* \*